United States Patent
Kellstrom

(10) Patent No.: US 9,810,262 B2
(45) Date of Patent: Nov. 7, 2017

(54) SPACER DEVICE, TOROIDAL ROLLER BEARING AND METHOD

(71) Applicant: Magnus Kellstrom, Partille (SE)

(72) Inventor: Magnus Kellstrom, Partille (SE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/931,900

(22) Filed: Nov. 4, 2015

(65) Prior Publication Data

US 2016/0131184 A1    May 12, 2016

(30) Foreign Application Priority Data

Nov. 7, 2014  (SE) .................................. 1451331

(51) Int. Cl.
| | |
|---|---|
| *F16C 19/40* | (2006.01) |
| *F16C 43/06* | (2006.01) |
| *F16C 23/08* | (2006.01) |
| *F16C 33/37* | (2006.01) |

(52) U.S. Cl.
CPC .............. *F16C 19/40* (2013.01); *F16C 23/08* (2013.01); *F16C 33/3706* (2013.01); *F16C 43/06* (2013.01)

(58) Field of Classification Search
CPC .. F16C 19/40; F16C 33/3706; F16C 33/4611; F16C 33/4664; F16C 33/4676; F16C 43/06; F16C 43/065
See application file for complete search history.

(56) References Cited

U.S. PATENT DOCUMENTS

| | | | |
|---|---|---|---|
| 5,597,243 A | 1/1997 | Kaiser et al. | |
| 8,347,507 B2 | 1/2013 | Ozu | |
| 8,414,193 B2 * | 4/2013 | Grull | F16C 33/3706 384/551 |
| 8,616,776 B2 * | 12/2013 | Nakamura | F16C 33/4635 384/470 |
| 8,814,436 B2 * | 8/2014 | Wendeberg | F16C 19/40 29/898.06 |
| 2010/0278470 A1 | 11/2010 | Grull et al. | |

FOREIGN PATENT DOCUMENTS

| | | | |
|---|---|---|---|
| DE | 102006040817 | * | 3/2008 |
| EP | 0175858 A1 | | 4/1986 |
| JP | 2007092983 A | | 4/2007 |
| WO | 2012044222 A1 | | 4/2012 |

* cited by examiner

*Primary Examiner* — James Pilkington
(74) *Attorney, Agent, or Firm* — Bryan Peckjian; SKF USA Inc. Patent Dept.

(57) ABSTRACT

A spacer device for roller elements of a toroidal roller bearing includes an inner ring with an inner ring raceway and an outer ring with an outer ring raceway. The toroidal roller bearing allows for axial and angular displacement between the inner ring and the outer ring. The spacer device comprises at least one centering element that is arranged to extend in between adjacent roller elements in a longitudinal direction of the roller elements when the spacer device is in use. The at least one centering element is arranged to make contact with at least one of one point or a region of one of the inner ring raceway or the outer ring raceway when the spacer device is in use, whereby the spacer device is centered on the one of the inner ring raceway or the outer ring raceway.

12 Claims, 2 Drawing Sheets

SPACER DEVICE, TOROIDAL ROLLER BEARING AND METHOD

CROSS REFERENCE TO RELATED APPLICATION

This is a Non-Provisional Patent Application, filed under the Paris Convention, claiming the benefit of Sweden (SE) Patent Application Number 1451331-1, filed on 7 Nov. 2014 (7 Nov. 2014), which is incorporated herein by reference in its entirety.

TECHNICAL FIELD

The present invention concerns a spacer device for roller elements in a toroidal roller bearing, and a toroidal roller bearing comprising such a spacer device. The present invention also concerns a method for manufacturing a toroidal device comprising such a spacer device.

BACKGROUND OF THE INVENTION

Toroidal roller bearings, such as CARB® toroidal roller bearings, are typically used for their ability of allowing both axial and angular displacement with respect to the outer ring and the inner ring of the toroidal roller bearing. This is enabled by the curved construction of the inner and outer rings' raceways which are adapted to conform to the curved shape of the roller elements, as described in European patent no. EP 0175858 for example. Hence, toroidal roller bearings combine self-aligning capability with axial displacement ability.

In order to maintain and support the roller elements in a toroidal roller bearing it is known to provide a cage to separate adjacent roller elements from each other in the tangential direction of the toroidal roller bearing, which restricts the movements of the roller elements in relation to each other and prevents roller-to-roller contact between the roller elements.

Today, the cage of a CARB® toroidal roller bearing can be roller-centered or inner ring-centered, and can be made of brass or steel.

SUMMARY OF THE INVENTION

An object of the invention is to eliminate or at least to alleviate the above mentioned drawbacks and to provide an improved spacer device for roller elements in a toroidal roller bearing, such as CARB® toroidal roller bearing, having an inner ring with an inner ring raceway and an outer ring with an outer ring raceway, wherein the toroidal roller bearing allows for axial and angular displacement between the inner ring and the outer ring, which spacer device enables more efficient separation of the roller elements while enhancing the load carrying capacity of a toroidal roller bearing.

This object is achieved by a spacer device that comprises at least one centering element that is arranged to extend in between adjacent roller elements in a longitudinal direction of the roller elements, i.e. along an axis parallel to the rotational axis of the toroidal roller bearing, when the spacer device is in use, i.e. when the spacer device is mounted in a toroidal roller bearing. The at least one centering element is arranged to make contact with at least one point or region of the inner ring raceway or the outer ring raceway when the spacer device is in use, whereby the spacer device is centered on the inner ring raceway or on the outer ring raceway, i.e. rests directly on the inner ring raceway or on the outer ring raceway, rather than on a flange or on a roller body, and supports the spacer device in the correct position.

The use of such a spacer device makes it possible for a toroidal roller bearing to replace a spherical roller bearing (SRB) without changes in the application and it causes fewer axial oscillations than a roller-centered-cage, since cage forces tend to reduce its misalignment.

If a centering element is arranged to make contact with a plurality of points or regions of the inner ring raceway or the outer ring raceway, any adverse influence on a lubricating oil film, will be closer to the roller ends where it is less critical. A centering element can however be shaped to create a separating oil film. Conventional roller-centered-cages are centered at the centre of the roller body where the oil film created is undesirably thinner than the oil film created by an inner ring raceway- or outer ring raceway-guided spacer device according to the present invention. The use of a spacer device according to the present invention therefore results in a toroidal roller bearing with improved lubrication compared to conventional spacer devices.

The spacer device according to the present invention is also less sensitive to rapid acceleration. The inner diameters of axial end portions of the spacer device (seen in an axial direction of the toroidal roller bearing when the spacer device is in use) may be increased since the axial end portions do not center on the inner ring of a toroidal roller bearing, thereby providing more space for external devices such as tightening nuts or sensor elements in the proximity of the axial end portions. Furthermore, the inner ring of a toroidal roller bearing does not have to be of a special design, but can be a standard inner ring. Thus, there is for example no need of any specific design features on the axial ends of the inner or outer ring of the toroidal roller bearing. Additionally, the full raceway width is available for the roller, thereby eliminating the risk of unfavorable contact.

According to an embodiment of the invention the centering element is arranged to make contact with a point or region at the centre of the inner ring raceway or of the outer ring raceway when the spacer device is in use. Alternatively or additionally, the centering element is arranged to make contact with a plurality of points or regions on the inner ring raceway or on the outer ring raceway when the spacer device is in use.

According to an embodiment of the invention the centering element comprises a surface having a shape that is adapted to conform to a surface of the inner ring raceway or of the outer ring raceway with which it is to make contact when the spacer device is in use.

According to an embodiment of the invention the spacer device may be constituted of a plurality of components and mounted in a toroidal roller bearing as a plurality of components. The spacer device according to the present invention may namely comprise a plurality of separate centering elements that are to be inserted in between adjacent roller elements in order to maintain the roller elements of a toroidal roller bearing in their intended relative position with respect to each other.

According to an embodiment of the invention the spacer device comprises a first part and a second part connected by connecting means that extend in between adjacent roller elements in the longitudinal direction of the roller elements when the spacer device is in use, and the at least one centering element is attached to the connecting means. The connecting means may be in the form of a cage bar, screw or pin and the centering element may comprise a through hole to receive the connecting means, or be attached to the connecting means in any suitable manner.

According to an embodiment of the invention the longitudinally outermost surfaces of the centering element are arranged at a distance in the longitudinal direction from the longitudinally innermost surfaces of the first part and the second part when the spacer device is mounted in the toroidal roller bearing. The distance may correspond to half the maximum axial displacement of the toroidal roller bearing. In this way, the centering element can remain in the middle of the inner ring raceway or the outer ring raceway while the spacer device moves with the roller elements.

According to an embodiment of the invention the centering element is axially moveable in the longitudinal direction of the roller elements. In another embodiment, the centering element is axially fixed in relation to the spacer device in the longitudinal direction. An axially fixed centering element may for example lead to a more rigid spacer device (and/or cage) and also provide a more cost-efficient manufacturing of the spacer device.

The present invention also concerns a toroidal roller bearing that comprises at least one spacer device according to any of the embodiments of the invention. The toroidal roller bearing may be used in automotive, wind, marine, metal producing applications and any other machine applications. For example, the toroidal roller bearing may be used in paper machines, continuous casters, fans and blowers, crushers and grinding mills, industrial transmissions, conveyors, and hydraulic motors and pumps.

The present invention further comprises a method for manufacturing a spacer device according to any of the embodiments of the invention, namely a spacer device for roller elements of a toroidal roller bearing having an inner ring with an inner ring raceway and an outer ring with an outer ring raceway, wherein the toroidal roller bearing allows for axial and angular displacement between the inner ring and the outer ring. The method comprises the step of providing the spacer device with at least one centering element that is arranged to extend in between adjacent roller elements in a longitudinal direction of the roller elements when the spacer device is in use. The method also comprises the step of providing the at least one centering element with a surface that is arranged to make contact with at least one point or region of an inner ring raceway or an outer ring raceway of the toroidal roller bearing when the spacer device is in use, i.e. when the spacer device is mounted in the toroidal roller bearing, whereby the spacer device will be centered on the inner ring raceway or on the outer ring raceway when the spacer device is in use.

According to an embodiment of the invention the method comprises the step of providing the centering element with a surface that is arranged to make contact with the centre of the inner ring raceway or of the outer ring raceway when the spacer device is in use. Alternatively, or additionally the method comprises the step of providing the centering element with a surface that is arranged to make contact with the two or more points or regions on the inner ring raceway or on the outer ring raceway when the spacer device is in use.

According to an embodiment of the invention the centering element is arranged to make contact with two or more points or regions on the inner ring raceway or on the outer ring raceway which are located an axial distance apart when the spacer device is in use. The two or more points or regions can thereby axially control the centering element on the raceway. An advantage of this is that the lubricant film build-up at the middle of a roller element, which is normally the part of the roller element which is subjected to the greatest load, is not disturbed.

According to an embodiment of the invention the method comprises the step of providing the centering element with a surface having a shape that is adapted to conform to a surface of the inner ring raceway or of the outer ring raceway with which it is to make contact when the spacer device is in use.

According to an embodiment of the invention the method comprises the step of manufacturing the spacer device to comprise a first part and a second part connected by connecting means that extend in between adjacent roller elements in the longitudinal direction of the roller elements when the spacer device is in use, and whereby the at least one centering element is attached to the connecting means.

According to an embodiment of the invention the method comprises the step of ensuring that the longitudinally outermost surfaces of the centering element are arranged at a distance in the longitudinal direction from the longitudinally innermost surfaces of the first part and the second part when the spacer device is mounted in the toroidal roller bearing. The distance may correspond to half the maximum axial displacement of the toroidal roller bearing.

According to an embodiment of the invention the centering element is arranged to be axially moveable in the longitudinal direction of the roller elements.

BRIEF DESCRIPTION OF THE DRAWINGS

The present invention will hereinafter be further explained by means of non-limiting examples with reference to the appended schematic figures where.

It should be noted that the drawings have not been drawn to scale and that the dimensions of certain features have been exaggerated for the sake of clarity.

DETAILED DESCRIPTION OF EMBODIMENTS

Figure 1:
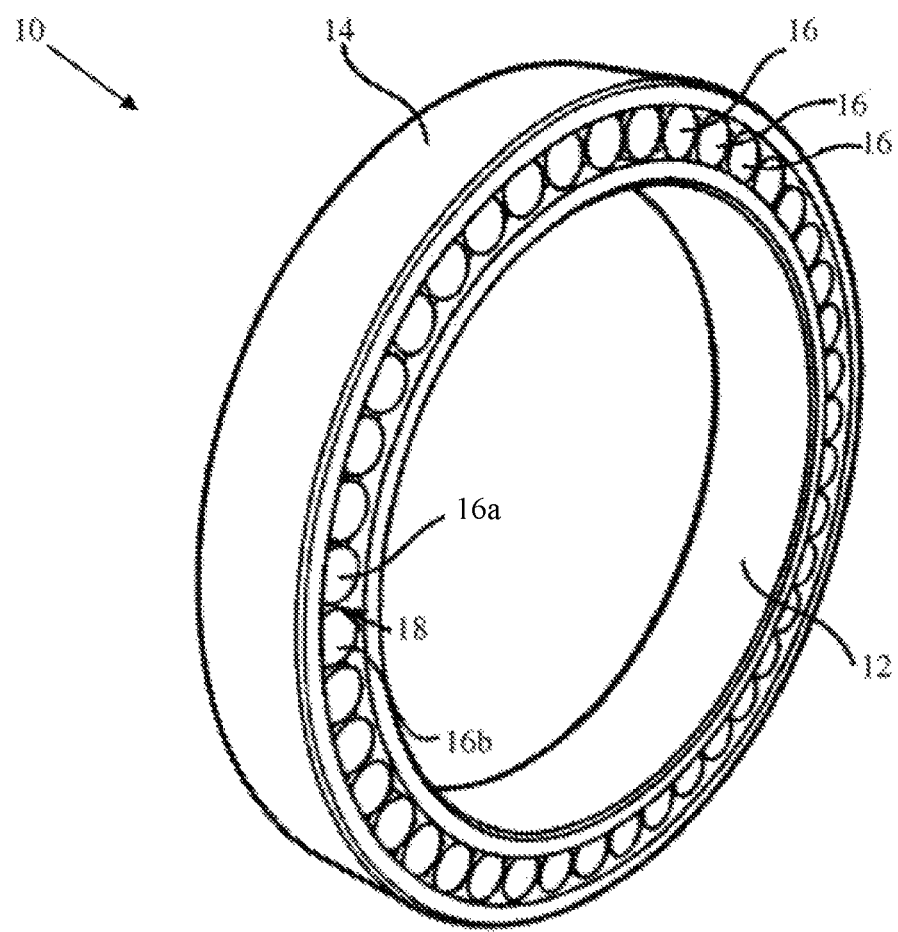
FIG. 1 shows a perspective view of a toroidal roller bearing according to an embodiment of the invention.

FIG. 1 shows a toroidal roller bearing 10 according to the present invention which has an inner ring 12 with an inner ring raceway, and an outer ring 14 with an outer ring raceway, wherein the toroidal roller bearing 10 allows for axial and angular displacement between the inner ring 12 and the outer ring 14. A plurality of roller elements 16 are arranged between the inner ring raceway and the outer ring raceway.

A toroidal roller bearing 10 according to the present invention may range in size from 10 mm diameter to a few meters diameter and have a load-carrying capacity from a few tens of grams to many thousands of tons. The toroidal roller bearing 10 according to the present invention may namely be of any size and have any load-carrying capacity.

The toroidal roller bearing 10 may for example be a CARB® toroidal roller bearing. A CARB® toroidal roller bearing is self-aligning like a spherical roller bearing, and axially free like a cylindrical or needle roller bearing. It accommodates misalignment and axial displacement within the bearing without inducing internal axial loads with virtually no increase in friction. This eliminates the need to compromise between a tight fit and axial freedom, permitting tight fits to be used to eliminate creep and fretting corrosion, which commonly occur with conventional bearing arrangements. The results are lower operating temperatures and reduced vibration levels and improvements in reliability, bearing and lubricant life and energy consumption.

The toroidal roller bearing 10 comprises a spacer device 18 that comprises components that are arranged between adjacent rollers 16a, 16b to separate adjacent roller elements 16a, 16b from each other in the tangential direction of the toroidal roller bearing 10, which restricts the movements of the roller elements 16 in relation to each other and prevents roller-to-roller contact between the roller elements 16.

Figure 2:
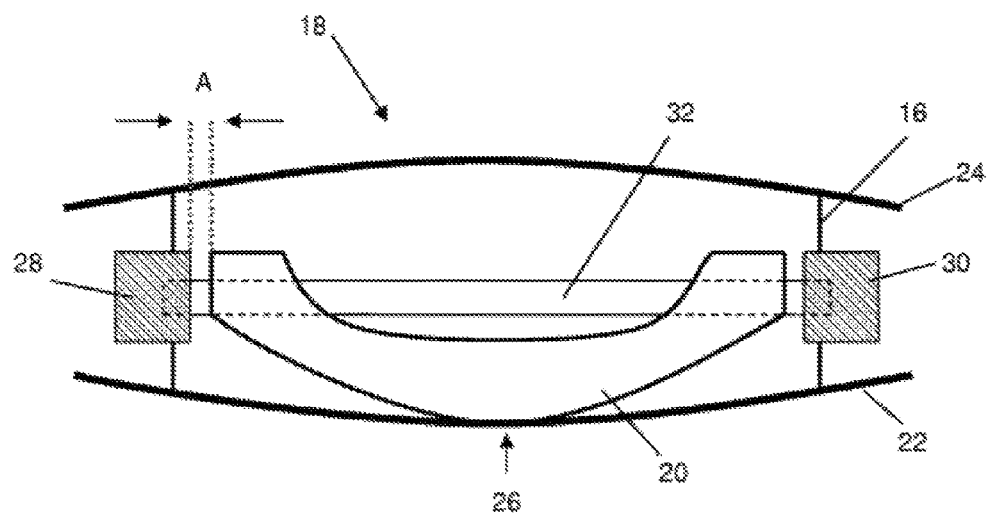
FIG. 2 shows a spacer device according to an embodiment of the invention.

FIG. 2 shows part of a spacer device 18 according to the present invention which is positioned next to a roller element 16 located between an inner ring raceway 22 and an outer ring raceway 24. The spacer device 18 comprises a centering element 20 that is arranged in between two adjacent roller elements 16a, 16b and extends in a longitudinal direction of the roller elements 16 when the spacer device 18 is in use. The centering element 20 is arranged to make contact with a point or region 26 at the centre of the inner ring raceway 22 in the illustrated embodiment. The centering element 20 may however be arranged to make contact with any other point or region of the inner ring raceway 22 or the outer ring raceway 24 when the spacer device 18 is in use, whereby the spacer device 18 is centered on the inner ring raceway 22 or on the outer ring raceway 24. The centering element 18 namely comprises a surface having a shape that is adapted to conform to a surface of the inner ring raceway 22 (or on the outer ring raceway 24) with which it is to make contact when the spacer device 18 is in use.

The centering element(s) 20 may be reinforced where it/they make(s) contact with an inner ring raceway 22 or an outer ring raceway 24 and where the supporting load is taken up. A centering element 20 is preferably provided between every two adjacent roller elements 16a, 16b. However, a cage may comprise just one centering element 20, or a plurality of centering elements 20 evenly or unevenly distributed around the toroidal roller bearing 10. The cage may then comprise cage bars of some other suitable form that do not comprise a centering element 20 between adjacent roller elements 16a, 16b.

A spacer device 18 according to the present invention may constitute a multiple-piece construction. For example, a spacer device 18 may comprise a first part 28 and a second part 30, such as first and second rings, or toothed rings for example, which are connected by connecting means 32 that extend in between adjacent roller elements 16 in the longitudinal direction of the roller elements 16. The connecting means 32 may be a pin, screw or cage bar, and the centering element 20 may be attached to the connecting means 32 as shown in FIG. 2. The centering element 20 may namely comprise a through hole for receiving the connecting means 32. Such a construction allows for a worn or damaged centering element 20 to be easily removed and replaced.

According to an embodiment of the invention the longitudinally outermost surfaces of the centering element 20 are arranged at a distance A in the longitudinal direction from the longitudinally innermost surfaces of the first part 28 and the second part 30 when the spacer device 18 is mounted in a toroidal roller bearing 10. The distance A preferably corresponds to half the maximum axial displacement of the toroidal roller bearing 10.

Figure 3:
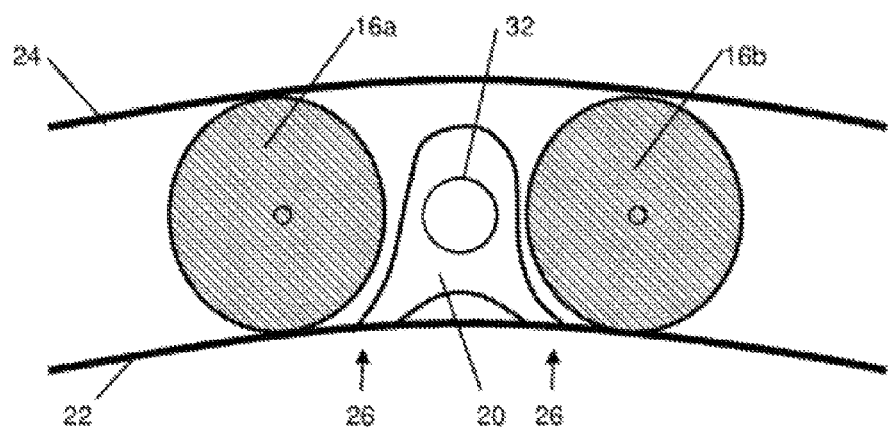
FIG. 3 shows a side view of a spacer device according to an embodiment of the invention.

FIG. 3 shows an embodiment in which a centering element 20 which extends between two adjacent roller elements 16a, 16b is arranged to make contact with two points or regions 26 on the inner ring raceway 22 when the spacer device 18 is in use. If the centering element 20 is axially moveable along the connecting means 32, equal load sharing between the two points or regions 26 can be ensured. The axial clearance of the spacer device could be kept small because additional clearance would not be needed for assembly as for the roller-centered-cage, or for misalignment as in the inner ring-centered-cage. It shall be noted that even though this specific embodiment shows an axially moveable centering element 20, it may also be advantageous to provide a centering elements 20 which is axially fixed in relation to the spacer device 18. This may for example lead to a more cost-efficient design and also it may lead to an increased rigidity and/or strength of the spacer device 18.

The present invention also concerns a method for manufacturing a spacer device 18 according to any of the embodiments of the invention. The method comprises the step of providing the spacer device 18 with at least one centering element 20 that is arranged to extend in between adjacent roller elements in a longitudinal direction of the roller elements 16 when the spacer device 18 is in use. The method comprises the step of providing the at least one centering element 20 with a surface that is arranged to make contact with at least one point or region 26 of an inner ring raceway 22 or an outer ring raceway 24 of the toroidal roller bearing 10 when the spacer device 18 is in use, whereby the spacer device 18 will be centered on the inner ring raceway 22 or on the outer ring raceway 24 when the spacer device 18 is in use.

The spacer device 18 according to the present invention may comprise any suitable elastic or non-elastic material. The spacer device 18 may comprise any of the following:
- a pressed sheet steel cage made from continuously hot-rolled low carbon sheet steel according to (DIN) EN 10111:1998 or stainless steel X5CrNi18-10 according to EN 10088-1:1995
- a machined steel cage made from non-alloyed structural steel of type S355GT (St 52) according to EN 10 025:1990+A:1993. The surface of the machined steel cage may be treated to improve sliding and wear resistance properties
- a sheet brass cage comprising brass conforming to EN 1652:1997.
- a machined brass cage machined from a CW612N cast or wrought brass according to EN 1652:1997.
- a polymer cage (with or without glass fiber reinforcement) comprising Polyamide 66, Polyamide 4,6, Polyetheretherketone (PEEK), Phenolic resin, or
- other engineering polymer materials, light alloys or special cast iron.

According to an embodiment of the invention the method comprises the step of providing the centering element 20 with a surface that is arranged to make contact with the centre 26 of the inner ring raceway 22 or of the outer ring raceway 24 when the spacer device 18 is in use, or with two or more points or regions 26 on the inner ring raceway 22 or on the outer ring raceway 24 when the spacer device 18 is in use.

According to an embodiment of the invention the method comprises the step of providing the centering element with a surface that is arranged to make contact with the two or more points or regions on the inner ring raceway or on the outer ring raceway which are located an axial distance apart when the spacer device is in use.

The method may comprise the step of providing the centering element 20 with a surface having a shape that is adapted to conform to a surface of the inner ring raceway 22 or of the outer ring raceway 24 with which it is to make contact when the spacer device 18 is in use.

The spacer device 18 may be manufactured as a cage in the form of a multi-component construction. For example, the spacer device 18 may comprise a first part 28 and a second part 30 connected by connecting means 32 that extend in between adjacent roller elements 16 in the longitudinal direction of the roller elements 16 when the spacer device 18 is in use, and whereby the spacer device may be manufactured to comprise a first part 28 and a second part 30 connected by connecting means 32 that extend in between adjacent roller elements 16 in the longitudinal direction of the roller elements 16 when the spacer device 18 is in use, and whereby the at least one centering element 20 is attached to the connecting means 32 in any suitable manner.

According to an embodiment of the invention the method comprises the step of ensuring that the longitudinally outermost surfaces of the centering element 20 are arranged at a distance A in the longitudinal direction from the longitudinally innermost surfaces of the first part 28 and the second part 30 when the spacer device 18 is mounted in the toroidal roller bearing 10. This distance A corresponds to half the maximum axial displacement of the toroidal roller bearing 10.

Further modifications of the invention within the scope of the claims would be apparent to a skilled person.

What is claimed is:

1. A spacer device for roller elements of a toroidal roller bearing having an inner ring with an inner ring raceway and an outer ring with an outer ring raceway, wherein the toroidal roller bearing allows for axial and angular displacement between the inner ring and the outer ring, the spacer device comprising:
    at least one centering element arranged to extend in between adjacent roller elements in a longitudinal direction of the roller elements when the spacer device is in use, the at least one centering element having a first longitudinal end and a second longitudinal end, a middle point of the at least one centering element being at a longitudinal location that is halfway between the first longitudinal end and the second longitudinal end, wherein a portion of the at least one centering element is arranged to make contact with at least one of a point or a region of one of the inner ring raceway or the outer ring raceway when the spacer device is in use, the portion of the at least one centering element having a longitudinal location between the first and second longitudinal ends of the at least one centering element and which generally overlaps the middle point, the portion of the at least one centering element being the only surface of the at least one centering element that contacts the inner ring or the outer ring,
    a first part and a second part connected by a connecting element that extends in between the adjacent roller elements in the longitudinal direction of the roller elements when the spacer device is in use, and the at least one centering element is attached to the connecting element,
    wherein the spacer device is centered on the one of the inner ring raceway or the outer ring raceway, the at least one centering element is independently axially moveable over the connecting element in the longitudinal direction of the roller elements relative to the first part and the second part of the spacer device.

2. The spacer device according to claim 1, wherein the at least one of the point or the region that the at least one centering element contacts is located at a center of the one of the inner ring raceway or the outer ring raceway when the spacer device is in use.

3. The spacer device according to claim 1, the portion of the at least one centering element further comprising a surface having a shape that is adapted to conform to a surface of the one of the inner ring raceway or the outer ring raceway with which it is to make contact when the spacer device is in use.

4. A spacer device for roller elements of a toroidal roller bearing having an inner ring with an inner ring raceway and an outer ring with an outer ring raceway, wherein the toroidal roller bearing allows for axial and angular displacement between the inner ring and the outer ring, the spacer device comprising:
    a first part and a second part connected by a connecting element that extends in between adjacent roller elements in a longitudinal direction of the roller elements when the spacer device is in use,
    at least one centering element attached to the connecting element and arranged to extend in between adjacent roller elements in the longitudinal direction of the roller elements when the spacer device is in use,
    wherein the at least one centering element is arranged to make contact with at least one of a point or a region of one of the inner ring raceway or the outer ring raceway when the spacer device is in use,
    wherein the spacer device is centered on the one of the inner ring raceway or the outer ring raceway, and
    wherein longitudinally outermost surfaces of the at least one centering element are arranged at a distance in the longitudinal direction from longitudinally innermost surfaces of the first part and the second part, respectively, when the spacer device is mounted in the toroidal roller bearing, wherein the distance corresponds to half a maximum axial displacement of the toroidal roller bearing.

5. The spacer device according to claim 4, wherein the at least one centering element is arranged to make contact with two points or regions of the one of the inner ring raceway or the outer ring raceway when the spacer device is in use, wherein the two points or regions are located a circumferential distance apart when the spacer device is in use.

6. A toroidal roller bearing, having:
    an inner ring with an inner ring raceway;
    an outer ring with an outer ring raceway; and
    the spacer device of claim 4.

7. A method for manufacturing a spacer device for roller elements of a toroidal roller bearing, the toroidal roller bearing having:
    an inner ring with an inner ring raceway; and
    an outer ring with an outer ring raceway,
    wherein the toroidal roller bearing allows for axial and angular displacement between the inner ring and the outer ring,
    the method comprising steps of:
    providing the spacer device with a first part and a second part connected by a connecting element that extends in between adjacent roller elements in a longitudinal direction of the roller elements when the spacer device is in use, the spacer device further comprising at least one centering element attached to the connecting element and that is arranged to extend in between the adjacent roller elements in the longitudinal direction of the roller elements when the spacer device is in use, wherein longitudinally outermost surfaces of the at least one centering element are arranged at a distance in the longitudinal direction from longitudinally innermost surfaces of the first part and the second part, respectively, when the spacer device is mounted in the toroidal roller bearing, wherein the distance corresponds to half the maximum axial displacement of the toroidal roller bearing; and providing the at least one centering element with a surface arranged to make contact with at least one of a first point or a region of one of an inner ring raceway or an outer ring raceway of the toroidal roller bearing when the spacer device is in use, whereby the spacer device will be centered on the one of the inner ring raceway or the outer ring raceway when the spacer device is in use.

8. The method according to claim 7, wherein the at least one of the first point or the region that the surface is arranged to make contact with is located at a center of the one of the inner ring raceway or the outer ring raceway when the spacer device is in use.

9. The method according to claim 7, further comprising a step of providing the at least one centering element with a second surface that is arranged to make contact with one of a second point or region on the one of the inner ring raceway or the outer ring raceway when the spacer device is in use.

10. The method according to claim 9, wherein the first point or the region and the second point or region are located a circumferential distance apart when the spacer device is in use.

11. The method according to claim 7, wherein the surface having a shape that is adapted to conform to a surface of the one of the inner ring raceway or the outer ring raceway with which it is to make contact when the spacer device is in use.

12. The method according to claim 7, further comprising a step of arranging the at least one centering element to be axially moveable in the longitudinal direction of the roller elements.

\* \* \* \* \*